Nov. 22, 1932.  F. L. BOYNTON  1,888,656
DIFFERENTIAL GEAR
Filed May 16, 1932
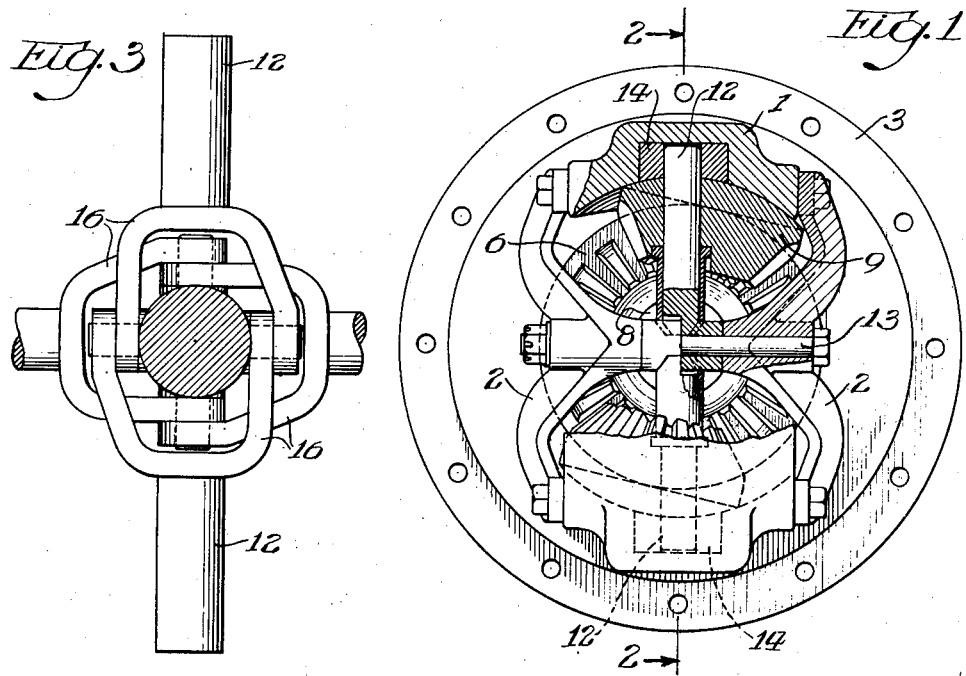
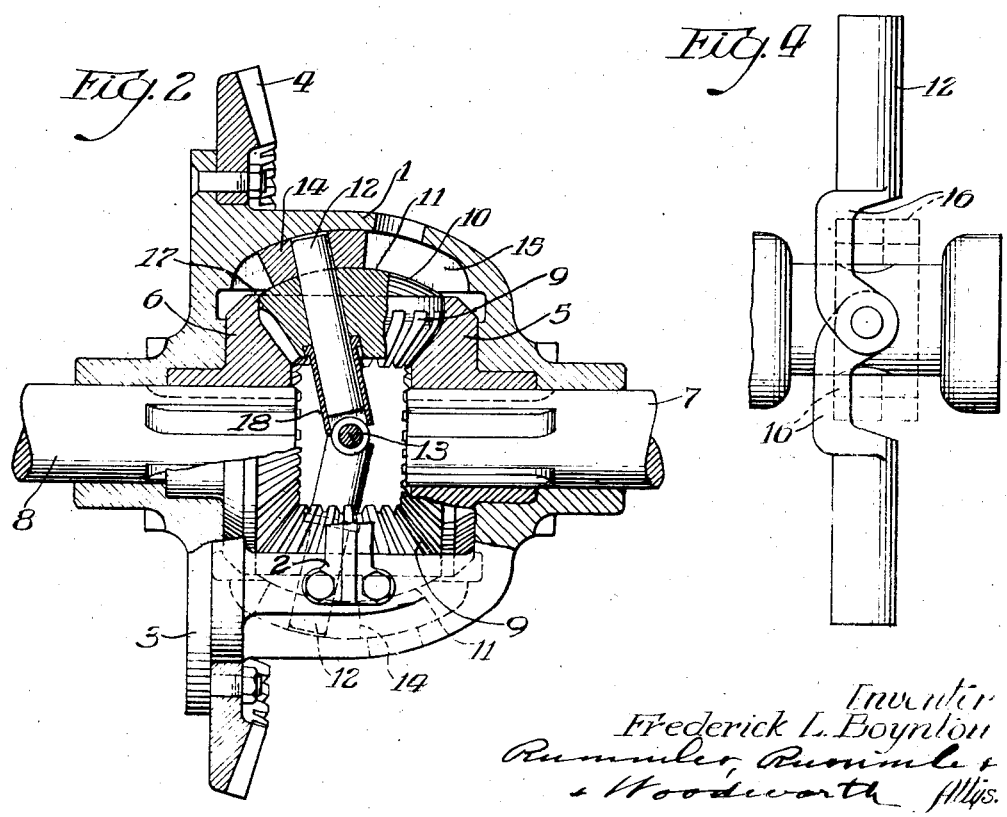
Inventor
Frederick L. Boynton Patented Nov. 22, 1932

1,888,656

UNITED STATES PATENT OFFICE

FREDERICK L. BOYNTON, OF SYCAMORE, ILLINOIS

DIFFERENTIAL GEAR

Application filed May 16, 1932. Serial No. 611,606.

This invention relates to differential gearing particularly designed for the driving of vehicle axles, and is herein shown as bevel gearing of the general character now most commonly used in powered road vehicles.

The principal object of the invention is to so modify such gearing that it will automatically change the leverage or gear ratio between the driven axles at times of differential action and thus alternately vary the torque applied to the driven axles so that one will momentarily receive more power than the other. Thus there is less tendency for the wheel having the least traction to absorb all the energy delivered through the differential gearing.

The objects of the invention are accomplished by means of the construction illustrated in which Figure 1 is an end view partly broken away and in section of the improved differential gearing.

Fig. 2 is a longitudinal sectional view taken on the line 2—2 of Fig. 1.

Fig. 3 is a modified detail illustrating spider shafts for the pinions of a 4-pinion differential gearing.

Fig. 4 shows a side view of the modification illustrated by Fig. 3.

The construction provided by this invention is, with reference to its principal elements, substantially the same and normally operates practically in the same manner as the now very commonly used bevel differential gearing in automobiles, except that it provides for a varying distribution of power to the driven wheels when there is a tendency for one of the wheels to unduly increase in speed, due to lack of proper traction. This purpose is accomplished by providing a mounting for the intermediate pinions which, by a shifting center of rotation, permits the pinions to roll slightly back and forth relatively to the opposed driven gears. The mounting of the pinions includes supporting shafts therefor which pass through the pinions eccentrically. These shafts are guided for the desired action in the supporting frame structure of the differential gearing and serve to transmit the rotary motion of the frame structure to the driving pinions.

Referring to the drawing, the supporting frame structure 1 is strengthened by the spiders 2 and has the customary flange 3 to which the ring gear 4 is bolted. The frame 1 provides journals for the co-axial bevel gears 5 and 6 to which the driven axles 7 and 8 are splined. The intermediate pinions 9 are supported in structure 1 to be carried around with it when the latter rotates and thus as usual drive both of the gears 5 and 6. The outer faces 10 of the pinions are convex and seat in the concave bearing surfaces provided by structure 1. The pinions are free to rotate in these concave seats and thus may unequally divide the power delivered to shafts 7 and 8, when one offers greater resistance to turning than the other.

Instead of mounting the pinions to rotate on concentric shafts or spider arms as is customary the pinions are perforated eccentrically at an angle to their axes to receive the spider shafts 12 which are at their inner ends pivoted on a bolt 13 carried by the frame spiders 2. The outer ends of the shafts 12 are seated in slide blocks 14 which fit within guideways 15 formed in structure 1.

These guideways extend in the direction of the axes of shafts 7 and 8 and thus permit oscillation of shaft 12 around the bolt 13 in this direction. So long as the shafts 7 and 8 are driven at the same speed, pinions 10 do not rotate on their axes, but when a pinion does rotate, the blocks 14 are compelled to oscillate in the guideways 15, and since the shafts 12 cannot oscillate transversely to the direction of the guideway 15, the pinions 9 must roll back and forth relatively of and along the faces of the gears 5 and 6. The extent of this rolling motion of the pinion relative to the gears 5 and 6 corresponds with the eccentricity of their journals on shaft 12.

In a 2-pinion differential gearing such as illustrated by Figs. 1 and 2, the inner bearing ends of shafts 12, as shown in Fig. 1, are offset on the bolt 13 so that the shafts may lie in the same plane. In a 4-pinion differential gearing the shafts 12 are forked at their bearing ends 16 as illustrated by Figs. 3 and 4. These forked ends of the shafts 12 are formed to clear each other so as to permit the required oscillation of the shafts. In Fig. 4 one pair of these elements is indicated by the broken lines.

Both the pinions 9 and the driven gears 5 and 6 are provided with annular contacting surfaces 17, which prevents an inward thrust from causing any of the gears to intermesh deeper than provided for by a predetermined pitch line. Inward thrust of pinions 9 is further resisted by the sleeves or collars 18 on the spider shafts 12.

In the operation of the differential gearing in normal straight driving, the unit rotates without relative motion occurring between its elements except as required for compensating for irregularities in the road surface. Also, in making a turn there is only such slight differential action needed to compensate for the difference in radii of the curves followed by the wheels. In this case, the planetary pinions 9 which drive the gears 5 and 6 roll more or less thereon as is common in differential gears of this class. Each axle receives its due proportion of the power applied. In case of a tendency of one wheel to slip due to poor traction, a rolling of pinions 9 on the gear 5 or 6, having the better traction, takes place. During such rolling of the pinions the shafts 12 must shift or oscillate along the guideways 15 to accommodate the changing positions of the pinions, as the latter cannot shift bodily in this direction, but may to the extent of their eccentricity roll in a plane transversely to such direction of movement. As the supporting shafts 12 for the pinions change their angular position around their pivotal supports 13, the leverage of the intermediate pinions between the gears 5 and 6 changes, first in favor of one of the gears, and then the other. In the standard bevel gear differential the pinions are concentrically pivoted on the spider arms and hence always exert a one-to-one leverage between the driven gears. In this case the ratio changes. Thus at times the wheel having the lesser traction becomes alternately more and less effective as a fulcrum for the pinions to turn on and drive the opposite wheel. This increase and decrease in the value of the force exerted on the non-rotating wheel enables it to get the car in motion when resting upon a slippery surface.

The principles of the invention are applicable to spur gear differentials as well as the bevel type illustrated, and although but one specific embodiment of this invention is herein shown and described, it will be understood that details of the construction shown may be altered or omitted without departing from the spirit of this invention as defined by the following claims.

I claim:

1. A differential gearing comprising a pair of driven gears, a driving pinion intermediate the driven gears, a shaft passing through said pinion at an angle to the axis of the pinion, said shaft being pivotally supported at one end on a rotatable supporting frame structure, said supporting frame structure having a guideway with which the opposite end of the shaft interfits, and means for rotating said supporting frame structure.

2. Differential gearing comprising a pair of driven gears, a driving pinion intermediate said gears and meshing therewith, a shaft extending eccentrically through said driving pinion, a rotary frame structure within which said shaft is mounted for motion therewith and for translational movement thereon, and means for driving said rotary frame structure.

3. Differential gearing comprising a pair of driven bevel gears, a driving pinion intermediate said bevel gears and meshing therewith, a shaft extending eccentrically through said driving pinion, a rotating frame structure within which said shaft is mounted for rotation therewith and for oscillation relatively thereto, and means for driving said rotary frame structure.

4. Differential gearing comprising a rotatable driving frame structure, a pair of opposed driven bevel gears journaled in said driving structure, a pinion intermediate said driven bevel gears and meshing therewith, said pinion being supported upon a shaft extending eccentrically therethrough and said shaft being supported by said frame structure in a manner to permit lateral oscillation of the shaft in the frame upon rotation of the pinion.

5. Differential gearing comprising a pair of driven bevel gears intermediate driving pinions meshing with said bevel gears, a rotating supporting structure within which the driven bevel gears are journaled and which is arranged to impart planetary motion to the intermediate pinion, said pinion being supported for rotation by a shaft extending eccentrically therethrough and guiding means in said frame structure causing the shaft to oscillate in the plane of the axis of the driven bevel gears when the pinion rotates.

6. Differential gearing comprising a pair of driven bevel gears, an intermediate driving pinion meshed with said bevel gears, a rotating supporting structure within which the driven bevel gears are journaled and which is arranged to impart planetary motion to the intermediate pinion, said pinion being supported for rotation by a shaft extending eccentrically therethrough and guiding means in said frame structure causing the shaft to oscillate in the plane of the axis of the driven bevel gears when the pinion rotates, said supporting structure having a concave seat against which the outer face of the pinion bears.

7. Differential gearing comprising a pair of driven bevel gears and an intermediate pinion meshing with said bevel gears and mounted for planetary motion, said bevel gears and intermediate pinion having annular bearing surfaces thereon designed to limit inward motion of the gears beyond the pitch line of the teeth, and a supporting shaft for the pinion passing eccentrically therethrough.

Signed at Sycamore, in the county of De Kalb and State of Illinois, this 12th day of May, 1932.

FREDERICK L. BOYNTON.